March 6, 1962     E. T. SIWAKOSKI     3,024,343
SOLDERING AND UNSOLDERING GUN
Filed July 12, 1960

Inventor
Edward T. Siwakoski
By
Wooster, Davis & Cifelli
Attorneys

United States Patent Office 3,024,343
Patented Mar. 6, 1962

3,024,343
SOLDERING AND UNSOLDERING GUN
Edward T. Siwakoski, 101 Lakeview Drive,
Fairfield, Conn.
Filed July 12, 1960, Ser. No. 42,280
7 Claims. (Cl. 219—26)

This invention relates to a soldering and unsoldering gun or iron, and has for an object to provide such a gun or iron which is adapted for either soldering joints or unsoldering soldered joints.

It is a particular object to provide a gun which is especially adapted for unsoldering printed circuit boards of radio, television and any electronic equipment where unsoldering is difficult by present day methods, without possible damage to the component, part or printed circuit board being unsoldered.

It is also an object of the invention to provide such a gun or iron which acts on the suction principle to draw the solder from the joint after melting it.

Another object is to provide a device provided with heating means to melt the solder of the joint and having a passage leading from this means controlled by a valve and providing a hand operated movable means for creating a suction, with a lost motion connection from said movable means to the valve whereby operation of said movable means first creates a suction, and then further movement of this means shifts the valve to apply the suction to the passage from the heating means.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 2:
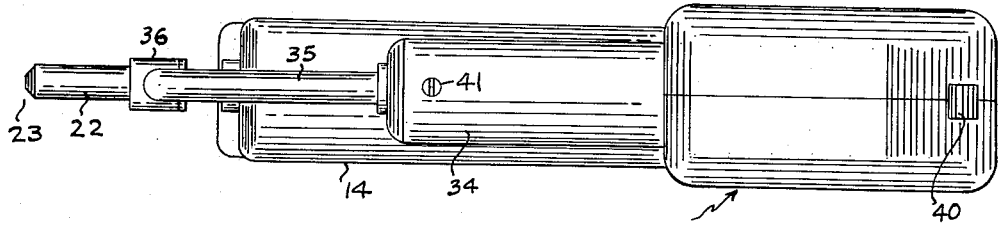
FIG. 2 is a top plan view thereof.

This gun or iron comprises a body or housing 10 made in two sections placed side by side and secured together by any suitable means such, for example, as screws 11, and it is made of insulating material such, for example, as a molded plastic or the like, and includes a hand grip 12. The two members on their opposed sides include a recess or chamber 13, in which is mounted a tube 14 providing a cylinder in which is a plunger or piston 15 mounted for longitudinal sliding movements in the cylinder. The cylinder may be held against longitudinal movement by suitable securing means such, for example, as a flange 16, seating in corresponding recesses in the members of the housing. A spring 17 tends to shift the plunger 15 forwardly and retain it in this position, while it may be retracted by a finger grip, such, for example, as a trigger 18 connected to the plunger by any suitable means, such as a screw 19 through an extension 20 operating through a slot 21 in the wall of the cylinder. Forward movement of the plunger may be limited by extension 20 seating against the forward end of the slot.

Secured to the front of the cylinder at its free outer end is a tubular copper soldering tip 22, which may be tapered at its outer end 23, and is provided with a longitudinal passage 24 leading from this outer end to an inner outlet in a chamber 25 at one end of the cylinder 14. The soldering tip 22 may be secured to the end of the cylinder by means of a heat inusulator 26, so that the heat from the tip is not transferred to the cylinder. The securing means 26 may have a passage 27 therethrough forming a continuation of the passage 24 in the soldering tip, and providing a valve seat 28 for the tapered end of a valve in the form of a pin 29 adapted to seat on this valve seat to close the inner end of the passage 24. A spring 44 is provided engaging a flange 42 on this valve and biased to normally hold it in its closed position. The chamber 25 may be open at the bottom, and closed by a clean-out door 30 hinged at 31, with a spring 32 tending to keep it in closed position.

Means is provided for heating the soldering tip 22. For this purpose there is mounted in a recess 33 in the housing one end portion of a hollow or tubular member 34, projecting through one end of which is a transfer element 35 of copper or suitable heat transfer or conducting material, secured at its free end to the soldering tip 22 by any suitable means, such as the sleeve 36 embracing this tip. The element 35 is surrounded within the chamber 37 in the member 34 by an electric resistance heating element 38, connected by leads or conductors 39 with any suitable supply of electric current, which may be the usual 110 to 120 volts A.C. or D.C. supply, and the action of the heating element is controlled by a suitable on-and-off switch 40. The element 35, together with the tip 22, may be removed from the device by sliding it out the end of the member 34 after loosening the set screw 41. The valve 29 is mounted for sliding movement within the piston or plunger 15, and is provided with a flange 42 spaced from the inner end 43 of the piston or plunger 15. A spring 44 pressing against this flange is biased to normally retain this valve 29 against the seat 28 to close the inner end of the passage 24 in the chamber 13. A heat insulating element 45 is provided between the member 34 and the cylinder 14, to prevent heating of the cylinder and the parts contained therein.

Figure 1:
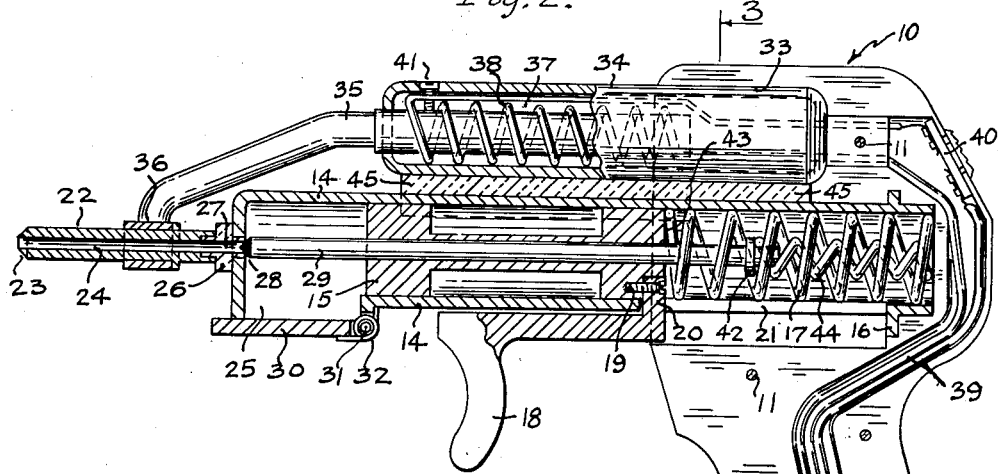
FIG. 1 is a vertical longitudinal section of the device.
Figure 3:
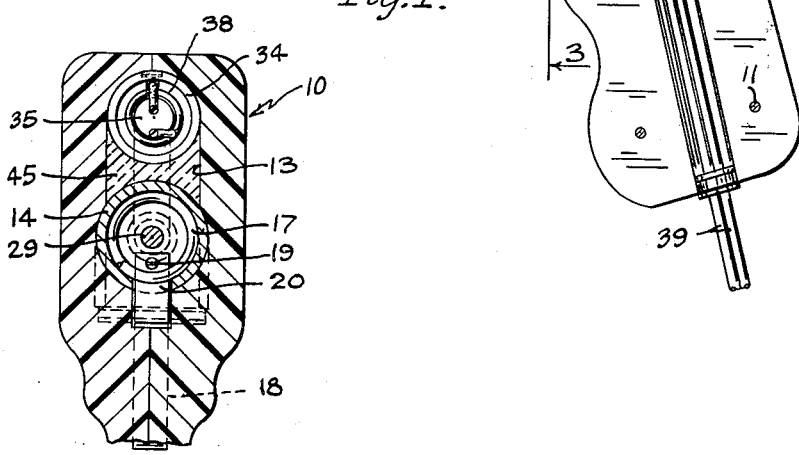
FIG. 3 is a vertical transverse section substantially on line 3—3 of FIG. 1.

In operation, the device acts for its unsoldering operation on the suction principle. After the switch 40 is closed, the heating element 38 heats the member 35 which transfers the heat to the soldering or unsoldering tip 22. In the unsoldering operation, the end of this tip is placed on a terminal to be unsoldered, and when the solder reaches a molten temperature the finger grip comprising the trigger 18 is pulled back carrying with it the plunger 15. This creates a suction or reduced pressure in the chamber 25, and then as the inner end 43 of the plunger engages the flange 42, on further movement it unseats the valve 29 from the inner end of the passage 24, and applies this suction to this passage and sucks the molten solder into this tip and through the passage where it falls and solidifies in the chamber 25. It ordinarily solidifies as drops or pellets which may be readily removed from the chamber 25 by opening the clean-out door 30. On release of the trigger 18 the springs 17 and 44 return the plunger 15 and the valve 29 back to their normal positions shown in FIG. 1, with the valve closing the inner end of the passage 24, and both in position for the next suction action. It will be seen the location of the flange 42 spaced from the inner end 43 of the plunger provides a lost motion connection between the plunger and the valve, which permits sufficient movement of the plunger to create a suction in the chamber 25 at the inner end of the passage 24, and then further movement of the plunger shifts the valve 29 to apply this suction to the passage 24 and the heated unsoldering tip. If the trigger is not operated the gun may be used as a regular soldering iron, as the tip 22 is heated as indicated.

It will be seen from the above that the device is first operated to create a suction at the inner end of a passage through the soldering tip by shifting of the plunger 15, and the further movement of the plunger, because of its lost motion connection with the valve 29 will shift this valve to uncover the inner end of this passage, and apply the suction to this passage for withdrawing the melted solder from the joint. The gun is particularly adapted for use by hobbyists, such as kit-builders for radio, television and electronic equipment. It is also well adapted for use by repairmen of electrical and electronic equipment, electronic assemblies and disassemblies, on production lines, as well as operators in "Do-it-yourself" workshops, and any other place where soldering and unsoldering is being done.

Having thus set forth the nature of my invention, I claim:

1. A soldering and unsoldering gun comprising a soldering tip provided with an outer free end and a longitudinal passage leading from said end to a receiving chamber, means for heat said tip, a valve at the inner end of said passage including a movable valve member normally closing said passage relative to said chamber, a spring biased to retain said member in the closed position, a casing including a hand grip, a cylinder supported by the casing communicating with said chamber, a plunger movably mounted in said cylinder, a finger actuated member operatively connected to said plunger and arranged for shifting said plunger to produce a suction in the chamber, and means automatically operable, after a suction has been produced in said chamber by initial movement of said plunger, in response to further movement thereof for shifting the valve member to open said passage and connect said passage and chamber to rapidly apply the suction to the passage in the tip to draw melted solder through this passage.

2. A soldering and unsoldering gun according to claim 1 in which the means for heating the tip comprises an electric heating element supported by the casing at a location spaced from said tip, and a heat transfer element connecting from the heating element and the tip.

3. A soldering and unsoldering gun according to claim 1 in which there is a spring biased to hold the plunger in an advanced position, and said valve shifting means includes a lost motion connection between the plunger and the movable valve member whereby after the plunger has been shifted to produce a suction in the chamber further movement of the plunger will shift the valve member to apply said suction to the passage in the tip.

4. A soldering and unsoldering gun comprising a heatable soldering tip having a free outer end and a longitudinal passage leading from said end, a valve including a retractable valve member closing the inner end of said passage, a cylinder communicating with the inner end of said passage, a plunger in said cylinder, means for shifting the plunger to produce a suction at the inner end of said passage, and means automatically operable after a suction has been provided at the inner end of said passage in response to further shifting of said plunger to shift the valve member to rapidly apply said suction to the passage in the tip.

5. A soldering and unsoldering gun according to claim 4 in which there is means normally retaining the valve member in closed position, and said valve shifting means includes a lost motion connection between the plunger and the valve member whereby after the plunger has been shifted to produce a suction at the inner end of the passage in the tip further movement of the plunger will shift the valve member to apply this suction to the passage.

6. A soldering and unsoldering gun according to claim 1 in which said chamber includes an open portion and a manually operable normally closed door therefor.

7. A soldering and unsoldering gun according to claim 4 in which said gun includes means for selectively making the portion of said cylinder at the inner end of said passage accessible from the exterior thereof.

References Cited in the file of this patent
UNITED STATES PATENTS

| | | |
|---|---|---|
| 2,491,165 | De Rugeris | Dec. 13, 1949 |
| 2,826,667 | Brillinger | Mar. 11, 1958 |
| 2,905,799 | De Rugeris | Sept. 22, 1959 |
| 2,960,591 | Brillinger | Nov. 15, 1960 |